J. A. HAMILTON.
TIRE SHRINKING MACHINE.
APPLICATION FILED OCT. 20, 1916.
1,264,641.
Patented Apr. 30, 1918.
3 SHEETS—SHEET 1.
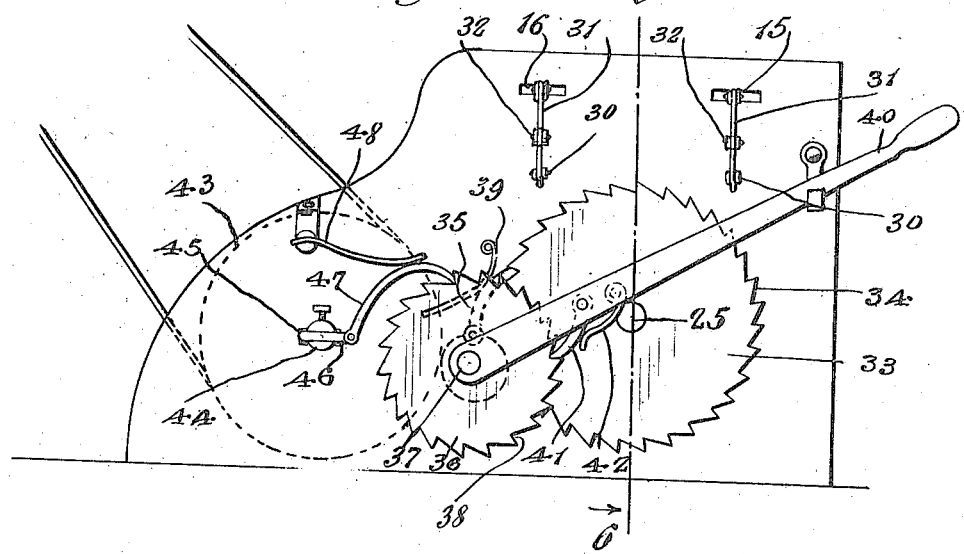
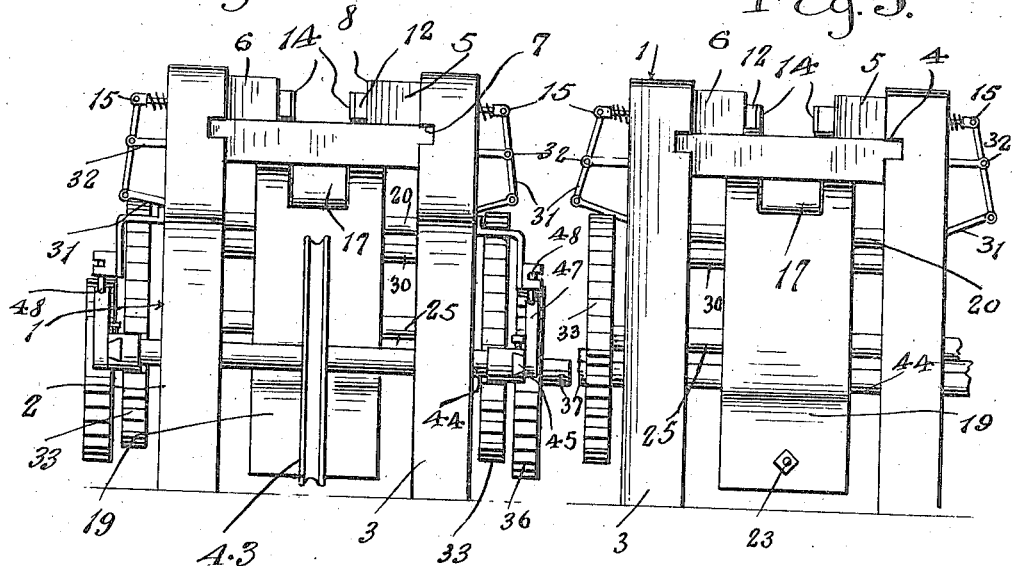
Inventor
J. A. Hamilton

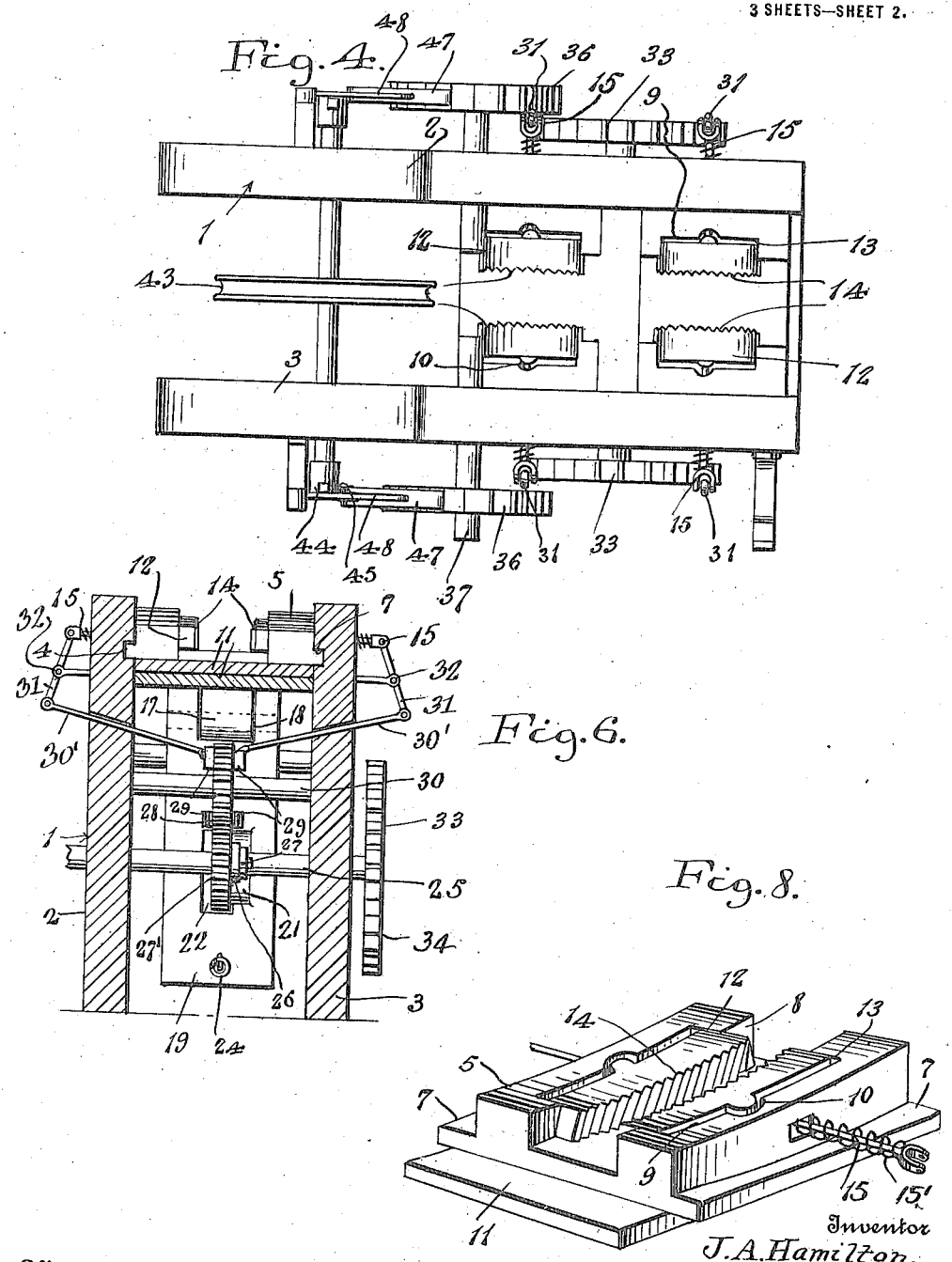

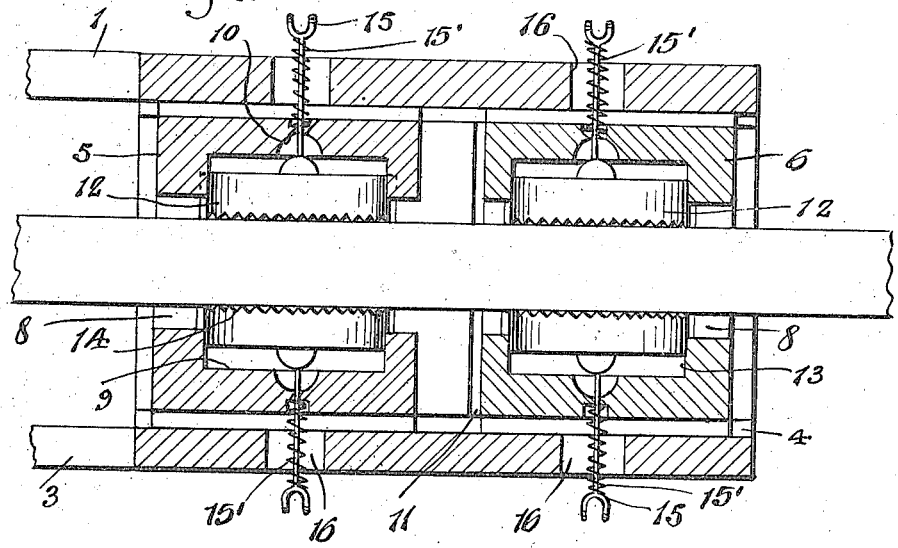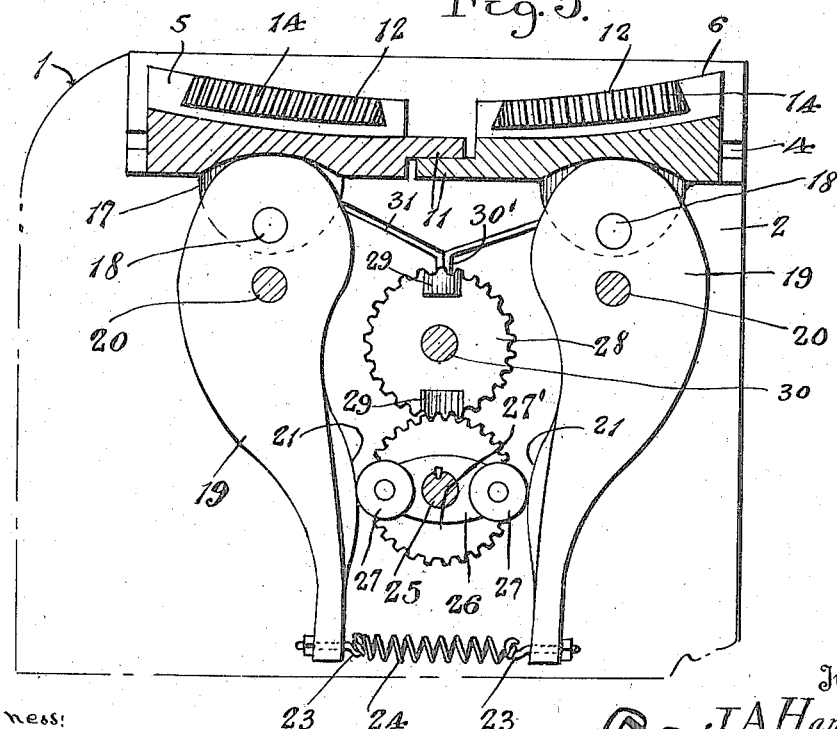

UNITED STATES PATENT OFFICE.

JOHN A. HAMILTON, OF TULSA, OKLAHOMA.

TIRE-SHRINKING MACHINE.

1,264,641.  Specification of Letters Patent.  Patented Apr. 30, 1918.

Application filed October 20, 1916. Serial No. 126,705.

*To all whom it may concern:*

Be it known that I, JOHN A. HAMILTON, a citizen of the United States, residing at Tulsa, in the county of Tulsa and State of Oklahoma, have invented certain new and useful Improvements in Tire-Shrinking Machines; and I do hereby declare the following to be a full, clear, and exact description of the invention, such as will enable others skilled in the art to which it appertains to make and use the same.

This invention relates to new and useful improvements in tire shrinking machines and the principal object of the invention is to provide a device for shrinking wagon and vehicle tires without requiring that the same be heated.

Another object of the invention is to provide a tire shrinking machine which is arranged so that the tire will be released so that the same may be partially rotated after each shrinking operation.

A further object of the invention is to provide a device having a pair of gripping jaws mounted on a pair of slidable carriages which are arranged to move toward each other when the jaws clamp the tire.

A still further object of the invention is to provide a novel driving means for the device which may be either power or manually operated.

A still further object of the invention is to provide an adjusting means by which the speed of the operation of the machine may be controlled.

With these and other objects in view the invention consists in the novel combination and arrangement of parts which will be fully set forth in the following specification and accompanying drawings, in which:—

Figure 1 is a side view in elevation of a tire shrinking machine constructed in accordance with this invention.

Fig. 2 is an end view of Fig. 1.

Fig. 3 is an end view of the device taken from the end opposite that of Fig. 2.

Fig. 4 is a top plan view of the tire shrinking machine.

Fig. 5 is a longitudinal sectional view through the tire shrinking machine.

Fig. 6 is a transverse sectional view through the tire shrinking machine taken on line 6—6 of Fig. 1.

Fig. 7 is a horizontal sectional view, and

Figure 8 is a detail perspective view of one of the carriages or sliding blocks showing the gripping jaws in place.

Referring now to the drawings, 1 designates as an entirety the main frame of the machine comprising a pair of side walls 2 and 3. Each of the side walls 2 and 3 is formed adjacent its upper edge with a horizontal groove 4 in which the carriages 5 and 6 are slidably mounted. Each carriage is provided on opposite sides with tongues 7 which are slidable in the grooves and the said carriages are formed with arcuate grooves 8 in their upper faces in which the vehicle tire seats. Formed intermediate the ends of the carriages and extending outwardly from the grooves 8 on opposite sides thereof are suitable recesses 9 for the reception of the gripping jaws which will be more fully hereinafter described. Formed centrally of each of the recesses and extending into the bottom wall thereof are arcuate recesses 10 as clearly shown in the drawings. The carriages are formed with tongues 11, one of which is positioned with its lower surface in a plane with the under side of the carriage while the opposite tongue 11 is positioned with its under surface in a plane with the upper surface of the tongue which is flush with the under side of the first carriage. These tongues extend from adjacent ends of the carriages and it will thus be seen that one will overlie the other in the manner illustrated in Fig. 5.

Slidably mounted in the recesses 9 of the sliding blocks 5 and 6 are suitable jaws 12 which are provided with beveled ends which engage against the inclined walls 13 of the recesses 9. These beveled ends form dovetails to prevent the members 12 from moving vertically within the recesses. A plurality of teeth 14 are formed on the outer edges of the members 12 and are disposed so that their biting edges are opposite in the respective blocks so that when the blocks are moved toward each other the tire clamped between the jaws will be shrunk. Extending rearwardly from each of the jaw members is a suitable guide pin 15 which is slidable through a suitable opening in the rear wall of each recess and these pins extend through slots 16 formed in the opposite side walls 2 and 3. Springs 15' mounted upon the guide pins 15 normally hold the jaws 12 retracted; that is to say, in position to permit a tire to be inserted in the grooves 8 of the blocks 5 and 6 between the jaws.

Formed on the under side of each of the sliding carriages 5 and 6 are suitable downwardly extending ears 17 which are provided with openings to receive the pivot pins 18 carried in the upper ends of the levers 19 which are fulcrumed on stationary pins 20 extending between the walls 2 and 3. It will thus be seen that when the lower ends of the levers are moved the carriages will be slid longitudinally in the grooves. Suitable cam surfaces 21 are formed near the lower ends of the levers 19 and are adapted to be engaged by the rollers provided for rocking the levers as will be more fully hereinafter described. In order that when the lower ends of the levers 19 are contracted to their innermost limit they will escape engagement with a gear 28 suitable recesses 22 are formed in the levers 19 adjacent the cam surfaces 21 as clearly shown in Fig. 6. The lower ends of the levers are provided with apertures for the reception of hooks 23 to which is connected a retractile coil spring 24, which spring normally tends to pull the lower ends of the levers inwardly thus moving the sliding blocks away from each other.

In order that the blocks may be moved toward each other with considerable force, a suitable actuating mechanism is provided which comprises a shaft 25 journaled in suitable bearings carried by the walls 2 and 3 which shaft is provided at a point between the walls 2 and 3 with a cross member 26 having rollers 27 journaled adjacent its outer ends. Mounted on said shaft slightly in the rear of the cross member 26 is a pinion 27' which meshes with a pinion 28 mounted on a counter-shaft 30 which is journaled in and between the walls 2 and 3 and extends through the walls 2. Formed on the pinion 28 and projecting laterally therefrom are suitable lugs 29, the outer faces of which are curved to engage the plungers 30' on the levers 31 which are fulcrumed as at 32 on the outer side of the walls and have their opposite ends pivotally connected to the rods 15. These lugs by engaging the plungers 30' move the jaws 12 into and hold them in active or tire engaging position during the time the blocks 5 and 6 are being moved in the direction of each other to shrink the tire.

In order to provide a driving mechanism for the device the shaft 25 is extended through the walls 2 and 3 and provided with ratchet wheels 33 having a plurality of ratchet teeth 34 formed on their peripheries. These teeth 34 are adapted to be engaged by latch dogs 35 which are pivotally and eccentrically mounted on the shaft 37. Ratchet wheels 36 which in turn are mounted on the shaft 37 are provided with a plurality of ratchet teeth 38. Springs 39 hold the latch dogs 35 in contact with the teeth 34 so that upon rotation of the shaft 37 the latch dogs will alternately ride over and engage the teeth 34 thus transmitting rotary movement to the wheels 33. Mounted on the shaft 37 of the wheels 36 is a lever 40 provided intermediate its ends with a latch dog 41 having a spring 42 which holds said dog in engagement with the ratchet teeth 38 so that upon oscillation of the lever the device will be actuated. In order to operate the device by power a suitable belt wheel 43 is mounted on an axle 44. This axle is formed at opposite ends with heads having diametrically extending grooves 45 in which suitable pivot blocks 46 are slidably mounted. Each block 46 has pivotally connected thereto a latch dog 47 so that upon rotation of said shaft the latch dogs will be oscillated due to the fact that the pivots thereof are eccentrically mounted with relation to the axle. Springs 48 hold the latch dogs 47 in contact with the teeth 38 of the wheels 36 and it will thus be seen that upon rotation of the belt wheel 43 the mechanism will be driven.

In practice, the tire to be shrunk is placed in the grooves 8 of the blocks 5 and 6 between the jaws 12. The device is then set in operation through the medium of either the lever 40 or the belt wheel 43. The parts are so timed that during the operation of the device the jaws 12 will be forced into gripping engagement with the tire first, by the engagement of the lugs 29 with the plungers 30', after which the blocks 5 and 6 will start to move in the direction of each other, such movement of the blocks shrinking the tire. Immediately after the completion of this movement of the blocks, the lugs 29 will move out of engagement with the plungers 30', permitting the jaws 12 to be returned to and held in their inactive position by the springs 15'. This movement of the jaws 12 releases the tire and permits the blocks 5 and 6 to be returned to their initial position by the spring 24. The jaws 12 will be alternately moved into and out of tire engaging position, and the blocks 5 and 6 will be alternately moved in the direction of and away from each other, during the operation of the machine, whereby to subject the tire to a series of shrinking operations until it has been shrunk to the desired extent.

While in the foregoing there has been shown and described the preferred embodiment of this invention, it is to be understood that such changes may be made in the combination and arrangement of parts as will fall within the spirit and scope of the invention as claimed.

What is claimed is:—

1. In a tire shrinking machine, a frame, carriages slidably mounted in the frame, gripping jaws carried by the carriages, levers pivoted to the under sides of the carriages and means for oscillating said levers to cause the carriages to move toward and away from each other and a link and lever mechanism for controlling the operation of the gripping jaws.

2. A device of the class described, a frame, a pair of carriages slidably mounted in the frame, said carriages being in the same plane and having arcuate grooves in their upper sides, gripping jaws operable in the side walls of the grooves to engage a tire when the same is placed in the groove, levers pivoted within the frame and to the carriages, spring means connected with the lower ends of the levers to move the same inwardly and thereby move the carriages outwardly and mechanical means for moving the lower ends of the levers outwardly and simultaneously causing the gripping jaws to move to closed position.

3. A device of the class described, a frame, a pair of carriages slidably mounted in the frame, said carriages being in the same plane and having arcuate grooves in their upper sides, gripping jaws operable in the side walls of the grooves to engage a tire when the same is placed in the groove, levers pivoted within the frame and to the carriages, spring means connected with the lower ends of the levers to move the same inwardly and thereby move the carriages outwardly and intermittent means for moving the lower ends of the levers outwardly and the carriages toward each other.

4. A device of the class described, a frame, a pair of carriages slidably mounted in the frame, said carriages being in the same plane and having arcuate grooves in their upper sides, gripping jaws operable in the side walls of the grooves to engage a tire when the same is placed in the grooves, levers pivoted within the frame and to the carriages, spring means connected with the lower ends of the levers to move the same inwardly and thereby move the carriages outwardly and means by which the levers may be moved outwardly to cause an inward movement of the carriages.

5. A device of the class described, a frame, a pair of carriages slidably mounted in the frame, said carriages being in the same plane and having arcuate grooves in their upper sides, gripping jaws operable in the side walls of the grooves to engage a tire when the same is placed in the groove, levers pivoted within the frame and to the carriages, spring means connected with the lower ends of the levers to move the same inwardly and thereby move the carriages outwardly and a train of ratchet wheels adapted to control the movement of the means, a power pulley for controlling the movements of the ratchet wheels and a hand lever adapted to be used to operate the ratchet wheels when so desired.

6. A device of the class described, comprising a frame, a pair of carriages slidably mounted on the frame, said carriages being in the same plane and having arcuate grooves in their upper sides, gripping jaws operable in the side walls of the grooves to engage a tire when the same is placed in the grooves, levers pivoted within the frame and to the carriages, spring means connected to the lower ends of the levers to move the same inwardly and thereby move the carriages outwardly, a shaft journaled between the levers, a cam fixed to said shaft between the levers, a ratchet wheel fixed to said shaft, a second shaft, a dog eccentrically connected to the second shaft and engaging the ratchet wheel, a power pulley, a second dog operated by the power pulley, a second ratchet wheel fixed to the second shaft and engaged by the second dog, a hand lever, and a dog carried by the hand lever and engaging the second ratchet wheel.

7. A tire shrinking machine comprising a frame, carriages slidably mounted in the frame, gripping jaws carried by the carriages and having their opposed ends in overlapping engagement, and means adapted to alternately move the jaws into and out of tire engaging position and to alternately move the carriages in the direction of and away from each other.

In testimony whereof I affix my signature in presence of two witnesses.

JOHN A. HAMILTON.

Witnesses:
PHILLIP J. LANG,
ERNEST W. REEDY.